United States Patent [19]

Curtin

[11] Patent Number: 5,613,064
[45] Date of Patent: Mar. 18, 1997

[54] OUTPUT NETWORK FOR A FAULT TOLERANT CONTROL SYSTEM

[76] Inventor: Keith W. Curtin, 1738 Old Forge Rd., Charlottesville, Va. 22901-2112

[21] Appl. No.: 372,181

[22] Filed: Jan. 13, 1995

[51] Int. Cl.$^6$ .................................................. G06F 11/08
[52] U.S. Cl. .............................. 395/184.01; 395/183.06; 371/36
[58] Field of Search .................. 395/184.01, 183.06, 395/183.07, 183.01, 182.07, 182.08, 182.12, 182.09; 371/36

[56] References Cited

U.S. PATENT DOCUMENTS

| | | | |
|---|---|---|---|
| 3,805,235 | 4/1974 | Foster et al. | 371/36 |
| 4,583,224 | 4/1986 | Ishii et al. | 371/36 |
| 4,667,284 | 5/1987 | Asami | 371/36 |
| 4,683,105 | 7/1987 | Hager | 371/36 |
| 4,799,140 | 1/1989 | Dietz et al. | 371/36 |
| 4,868,826 | 9/1989 | Smith et al. | 371/36 |
| 4,998,194 | 3/1991 | Okamoto et al. | 371/36 |
| 5,471,099 | 11/1995 | Larabell et al. | 307/53 |

*Primary Examiner*—Robert W. Beausoliel, Jr.
*Assistant Examiner*—Joseph E. Palys
*Attorney, Agent, or Firm*—James H. Beusse

[57] ABSTRACT

A triple modular redundant control system which uses four controllers coupled in sets of two parallel controllers on relatively positive and relatively negative sides of a load. One of the controllers on one side of the load is energized only when both of the controllers on another side of the load are energized. The system implements a 2-out-of-3 logic function using only four controllers. The system includes a self-testing feature which allows the controllers to be tested even while a load is being operated without creating undue perturbations in load operation.

4 Claims, 5 Drawing Sheets

OUTPUT NETWORK FOR A FAULT TOLERANT CONTROL SYSTEM

BACKGROUND OF THE INVENTION

This invention relates to fault tolerant control systems, and, more particularly, to fault tolerant systems using multiple processors and output components configured such that a single fault will not lead to an incorrect load state.

Industrial control systems employ the measurement and acquisition of process quantities or states through instrumentation circuits interfaced to a processor via appropriate input modules. These field measurements are analyzed by a stored program within the processor which is executed periodically. The program is designed such that output control actions are generated to influence the process to the desired state in response to specific input conditions. Output modules connected to the processor convert the control actions of the stored program to voltage levels appropriate to the loads under control. In such control systems, it is desirable to provide a level of protection or assurance to increase the likelihood of continued system operation in the event of a component failure. Fault tolerant systems have traditionally been designed using special purpose, custom circuits with limited application. This has impeded the adoption of economy of scale in the manufacture of the components of these systems. Resultant high costs of production has limited their appeal in the general control market.

One example of a prior art fault tolerant system providing redundant output circuit design is shown in U.S. Pat. No. 4,868,826 where fault tolerant operation is achieved by connecting two output modules in parallel to a load. Each module is a custom design with two series outputs and two separate voters. The fault detection feedback circuit for each output is isolated from the load via a series diode, limiting its diagnostic scope to the components of the output module. Failures in the output wiring to the load, or of the load itself, cannot be detected due to the blocking action of the diode. Since the design of the module is specific to fault tolerant control, it does not achieve the sales volume of a truly general purpose input or output module as used in the programmable control industry. Hence, its manufacture is optimized for relatively low volume, high cost techniques.

SUMMARY OF THE INVENTION

It is an object of the present invention to provide a fault tolerant system for an industrial control system utilizing conventional programmable logic controllers. In an exemplary form, the invention is illustrated in a triple modular redundancy system based upon low end programmable logic controller (PLC) products. The PLC product includes input and output (I/O) modules having general applicability to a variety of non-fault tolerant systems leading to substantially lower system costs. Each system utilizes two output modules and two input modules connected in parallel to switch one side of a load to a first DC power source. A second pair of output modules and input modules are connected in parallel to switch another side of the load to a second DC power rail. The I/O modules are so arranged that failure of a single module can be detected but will not prevent power from being applied through the load through another of the modules. Diagnostic routine operative in the PLC product periodically exercises each output and input of the modules. The outputs are excited using short pulses which are non-disruptive to the load. As the outputs are exercised, the output states are sampled through the input modules and the input module information is analyzed to generate fault reports. Redundant parallel output modules thus assure that the controlled process remains operational while a failed module is being replaced.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
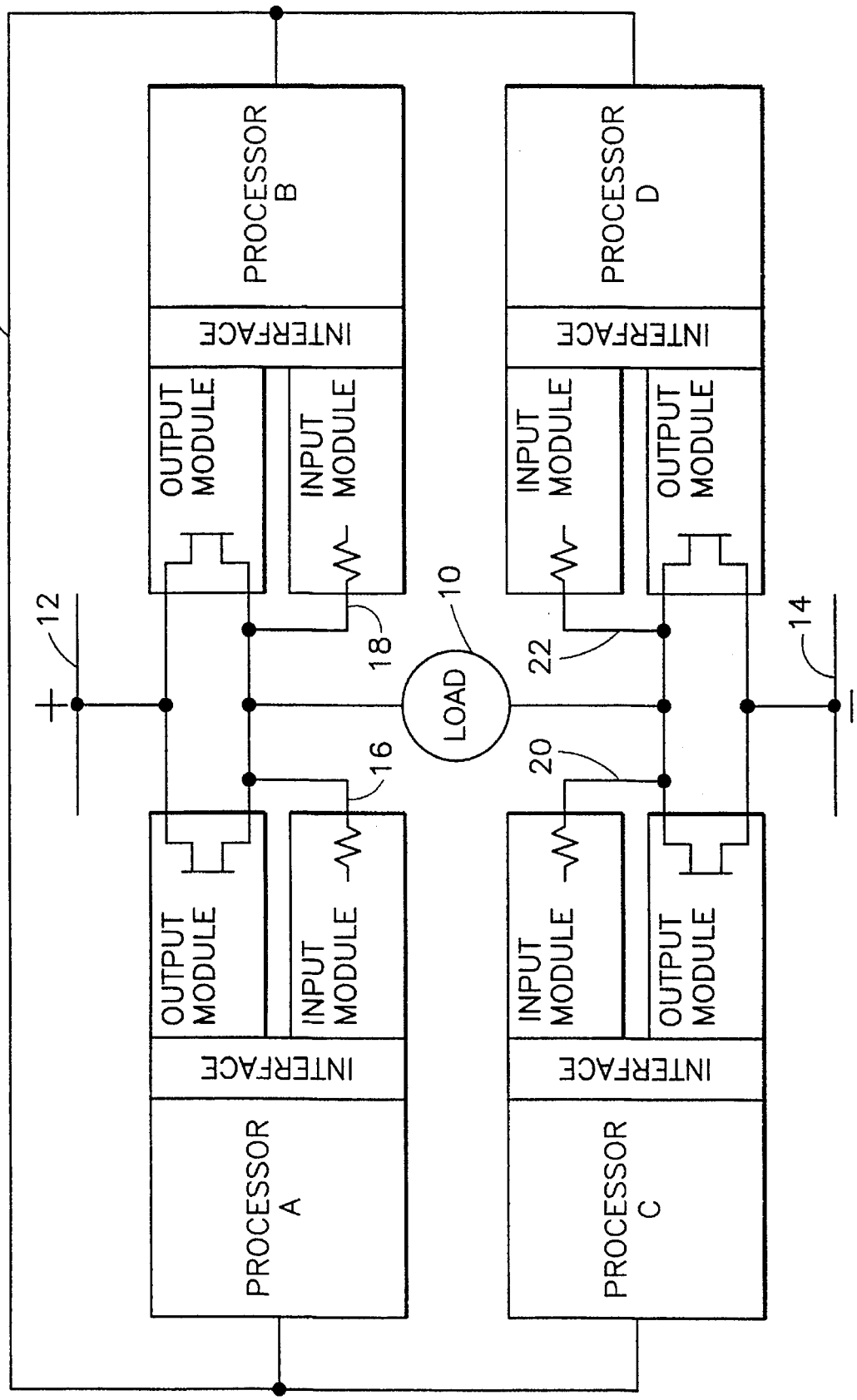
FIG. 1 is a simplified block diagram of a fault tolerant redundant control system in accordance with one embodiment of the present invention.
Figure 2:
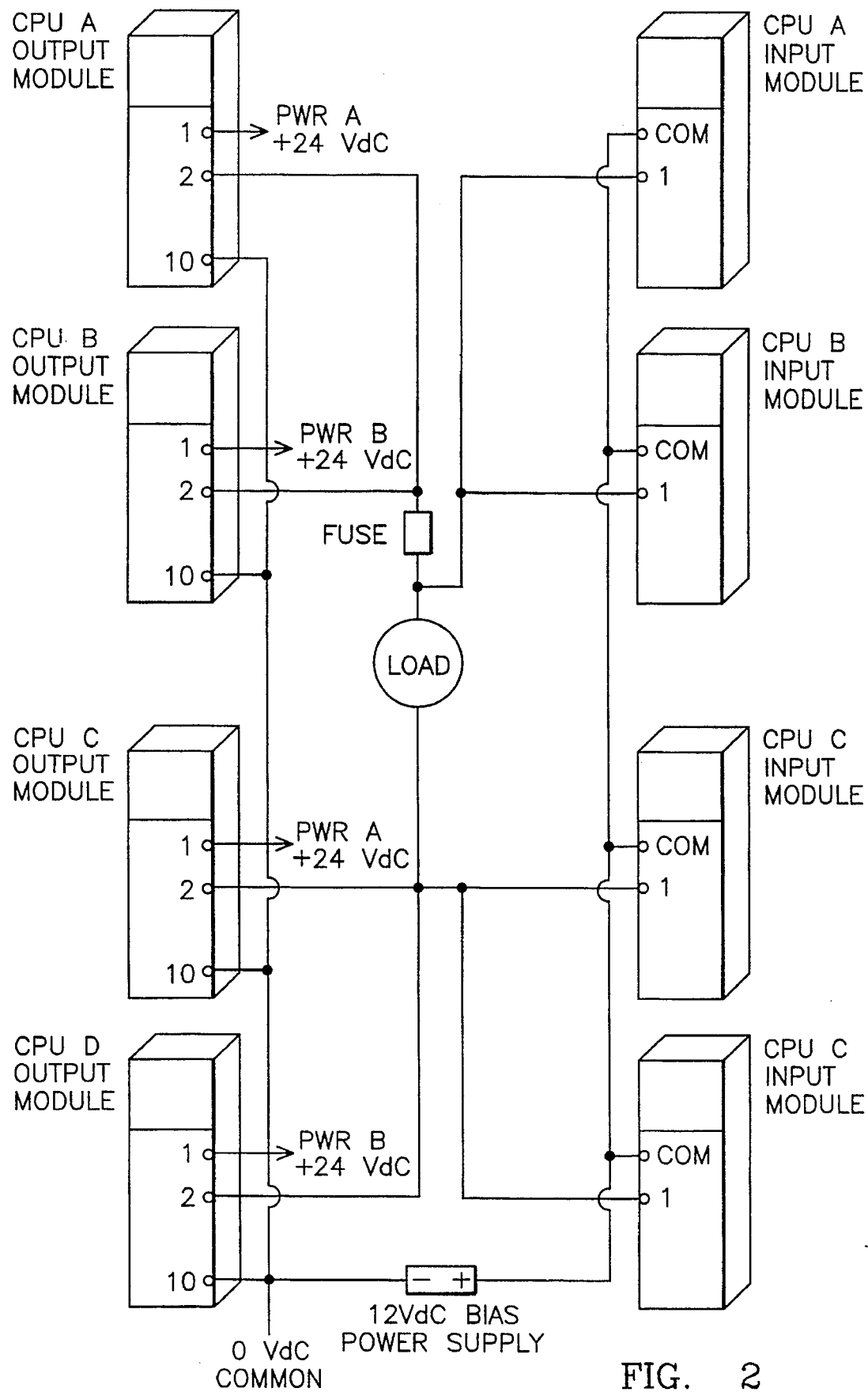
FIG. 2 is a simplified block diagram of an H pattern output with fault monitoring in accordance with the present invention.

Referring now to FIG. 1, a load 10 is connected to receive power by being connected between a relatively positive DC bus 12 and a relatively negative DC bus 14. Connections between the load 10 and the DC buses 12 and 14 is made through a plurality of programmable logic controllers (PLC) labeled processor A, processor B, processor C and processor D. Each of the PLC's may be substantially identical and in one embodiment are series 90-30 PLCs available from GE FANUC of North America, Inc. Each of the PLCs have a plurality of output and input (I/O) points which can be connected to control various apparatus or processes. Typically, each of the series 90-30 processors or PLCs can be configured with a plurality of circuit boards each of which may have discrete 8, 16 or 32 point IOs.

In the illustrative embodiment, processors A and B are connected in-parallel between the positive voltage bus 12 and an upper terminal of load 10. Each processor A and B is coupled via an input line 16 and 18 to the upper terminal of the load 10 for monitoring the voltage supplied to the load.

A lower or sink terminal of load 10 is connected to the second DC bus or return bus 14 through output modules of each of the processors C and D. As with the processors A and B, the processors C and D are connected in-parallel so that the lower terminal of load 10 can be supplied with power through either an output module of processor C or an output module of processor D. Each processor C and D further includes an input module connected via respective lines 20 and 22 to monitor the voltage at the lower terminal of load 10.

In operation, each of the three processors A, B and C generates one output to the load through its respective output module which represents the preferred output state as determined by a stored program in each processor. The fourth processor D receives the output states of processors A and B through a redundant communication network 24 and produces the logical "AND" product of outputs A and B, commonly referred to as "AB". The output module of processor D is operated in accordance with the ANDed product of outputs processors A and B. The resultant state of the load 10 will be equal to the Boolean equation AB+AC+BC, which corresponds to a two out of three vote of the outputs of the three processors A, B and C. The two out of three vote insures that the output of any single faulted processor A, B or C, or its output module will be voted out and that the load will remain under the control of the two operational processors and output modules. In actual practice, a typical control system would be comprised of multiple loads such as load 10 each connected as illustrated in FIG. 1 to other selected I/O points on each of the output modules and input modules of the processors A through D.

In order to improve the availability of the system of FIG. 1, it is desirable to use a test scheme which determines if an output of one of the output modules has failed. While a single failure will not stop system operation, the fact that a single failure exists will expose the system to the possibility that a second failure may render the system inoperable. The testing of the system is designed to detect a failure, specify its location and identify the nature of the failure. By providing such detailed information, the failure may be repaired more quickly. Before considering the exact testing process, reference is again made to FIG. 1 in which it can be seen that the input modules of each of the processors A and B and processors C and D are cross-coupled, i.e., the input to processor A is the same input that is supplied to processor B. This type of connection allows the operation of processor A to be verified by processor B and vice versa.

In order to perform testing of the programmable logic controllers, the four processors A-D must be loosely synchronized so that on a regular basis they can be interrupted and begin testing the output circuits. During testing, output states are modified under control of resident programs in each of the processors and the corresponding inputs are inspected to verify that proper output operation has occurred. Each processor's output state is changed for a very brief period since that under most conditions such changes do not perturb the attached loads. The test procedure is set forth as follows:

```
Label: Start
Set Cycle Number to 1
Label: Begin _ Cycle
Save all current output states
Which diagnostic cycle is this?
   Cycle = 1?: Test A Output
      Turn outputs B,C,D off
      Turn output A on
      Wait t milliseconds
      Is input B on?
         yes - then OK
         no - then "failed-off" output;
         set failure flag
      Restore states of outputs A,B,C,D
      Goto End_Cycle
   Cycle = 2?: Test B Output
      Turn outputs A,C,D off
      Turn output B on
      Wait t milliseconds
      Is input A on?
         yes - then OK
         no - then "failed-off" output;
         set failure flag
      Restore states of outputs A,B,C,D
      Goto End_Cycle
   Cycle = 3?: Test C Output
      Turn outputs A,B,D off
      Turn output C on
      Wait t milliseconds
      Is input D on?
```

-continued

```
         yes - then OK
         no - then "failed-off" output;
         set failure flag
      Restore states of outputs A,B,C,D
      Goto End_Cycle
   Cycle = 4?: Test D output
      Turn outputs A,B,C off
      Turn output D on
      Wait t milliseconds
      Is input C on?
         yes - then OK
         no - then "failed-off" output;
         set failure flag
      Restore states of outputs A,B,C,D
      Goto End_Cycle
   Cycle = 5?: Test for Open Load
      Turn outputs C,D off
      Turn output A,B on
      Wait t milliseconds
      Is input C or D on?
         yes - then OK
         no - then "open-load"; set
         failure flag
      Restore states of outputs A,B,C,D
      Goto End_Cycle
   Cycle = 6?: Test for Stuck Output
      Turn outputs A,B,C,D off
      Wait t milliseconds
      Is input A,B,C,D on?
         yes - then "failed-on" output;
         set failure flag
         no - then "failed-off" output;
         set failure flag
      Restore states of outputs A,B,C,D
      Goto End_Cycle
   Cycle = 7 through n: other system
   diagnostics
END_Cycle
Increment Cycle Number
If Cycle Number > n then set Cycle Number to 1
Go to Begin_Cycle
```

In the above high level program, it will be noted that the wait interval "t" is a variable. For cycles 1 through 4 and 6 the period t is determined by software, latencies and I/O circuit response times. For cycle 5, the period t is adjusted to accommodate load characteristics. For example, if the load is a resistive load there is no additional delay required. However, if the load is reactive such as may occur in driving a motor, substantial delays may be introduced by inductance in the loads. It is desirable that the variable t be as short as possible in order to reduce the scan time impact of diagnostics while long enough to allow reliable testing.

Figure 3:
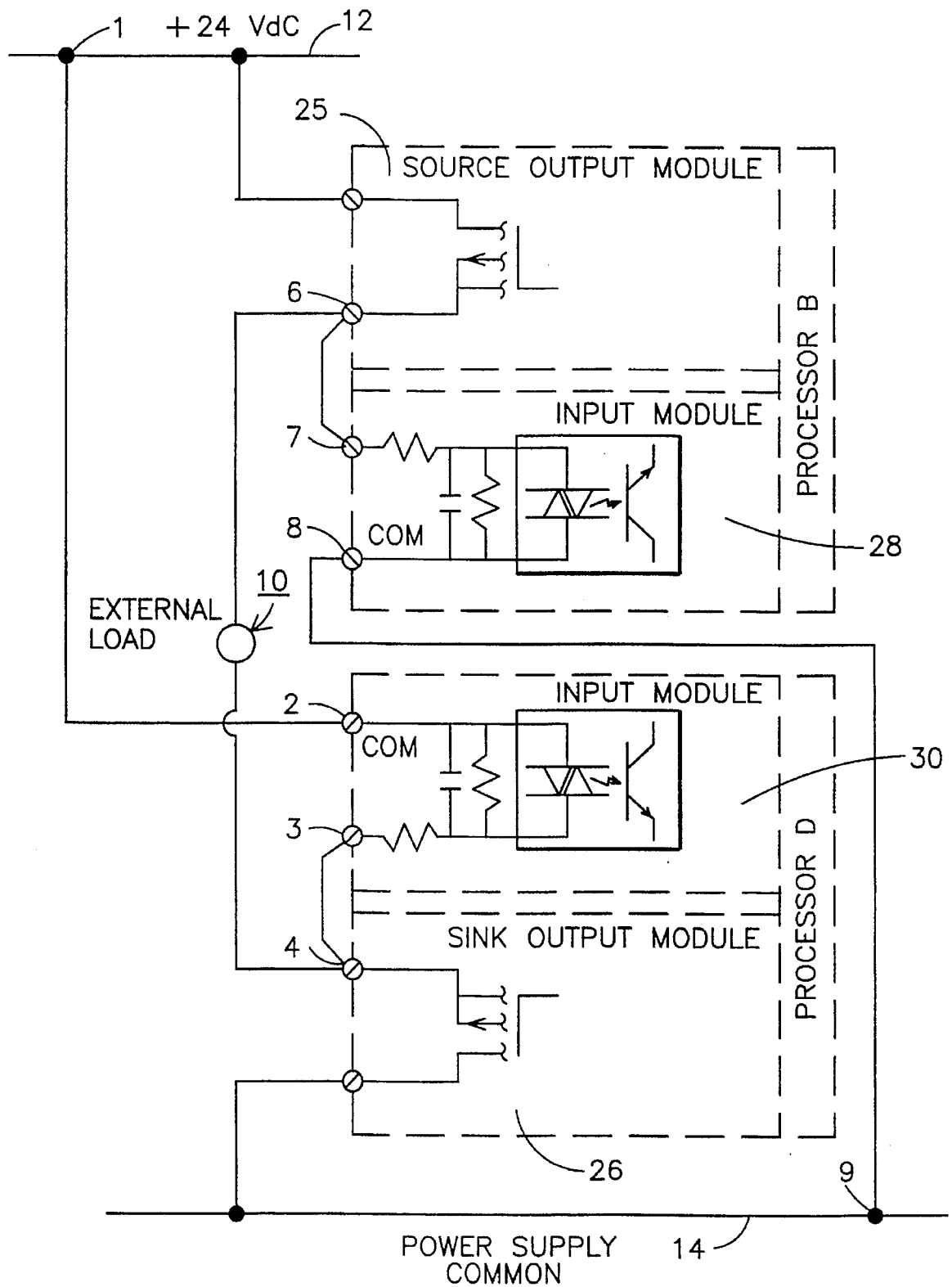
FIG. 3 is a simplified schematic representation of a portion of the system of FIG. 1.

Referring to FIG. 3, there is shown a single side of the H-pattern of FIG. 1, i.e., processors B and D. In this scheme, there is a sourcing output module 25 in series with load 10 which is in series with a sinking output module 26. Two input modules 28 and 30 have been connected, one to the upper node (point 6) on the external load 10 and the other to the lower node (point 4) of the load. The common connection (point 8) of the upper input module 28 is connected to the common connection point 9 (bus 14) on the power supply. The common connection (point 2) of the lower input module 30 is connected to the +24 side (bus 12) of the power supply bus.

The purpose of the input modules 28,20 is to detect voltage present at either of the output nodes (points 6 and 4) during diagnostic testing. The voltage thresholds for the GE Fanuc input modules are: guaranteed ON 11.5 to 30 Vdc guaranteed OFF 0 to 5 Vdc The sink and source output modules are rated for safe operation between 20.4 and 28.8 Vdc (24 Vdc+20%,–15%).

With all outputs off, there is a current path starting from +24 Vdc at point 1, through the low side input module 30, through the external load 10, through the high side input module 28, then returning to the power supply common. Assume that the load resistance is small compared to the input impedance of the input modules. In this case, the voltage divides evenly at 12 Vdc for each input module. This is greater than the guaranteed ON voltage, implying that both modules 28,30 will be ON.

Now assume that the power supply bus voltage drops to the low end of the allowable range, 20.4 Vdc. In this case, each input module will have 10.2 Vdc available, i.e., the input modules will be OFF. Accordingly, for the allowable voltage range, there is no guaranteed state.

Figure 4:
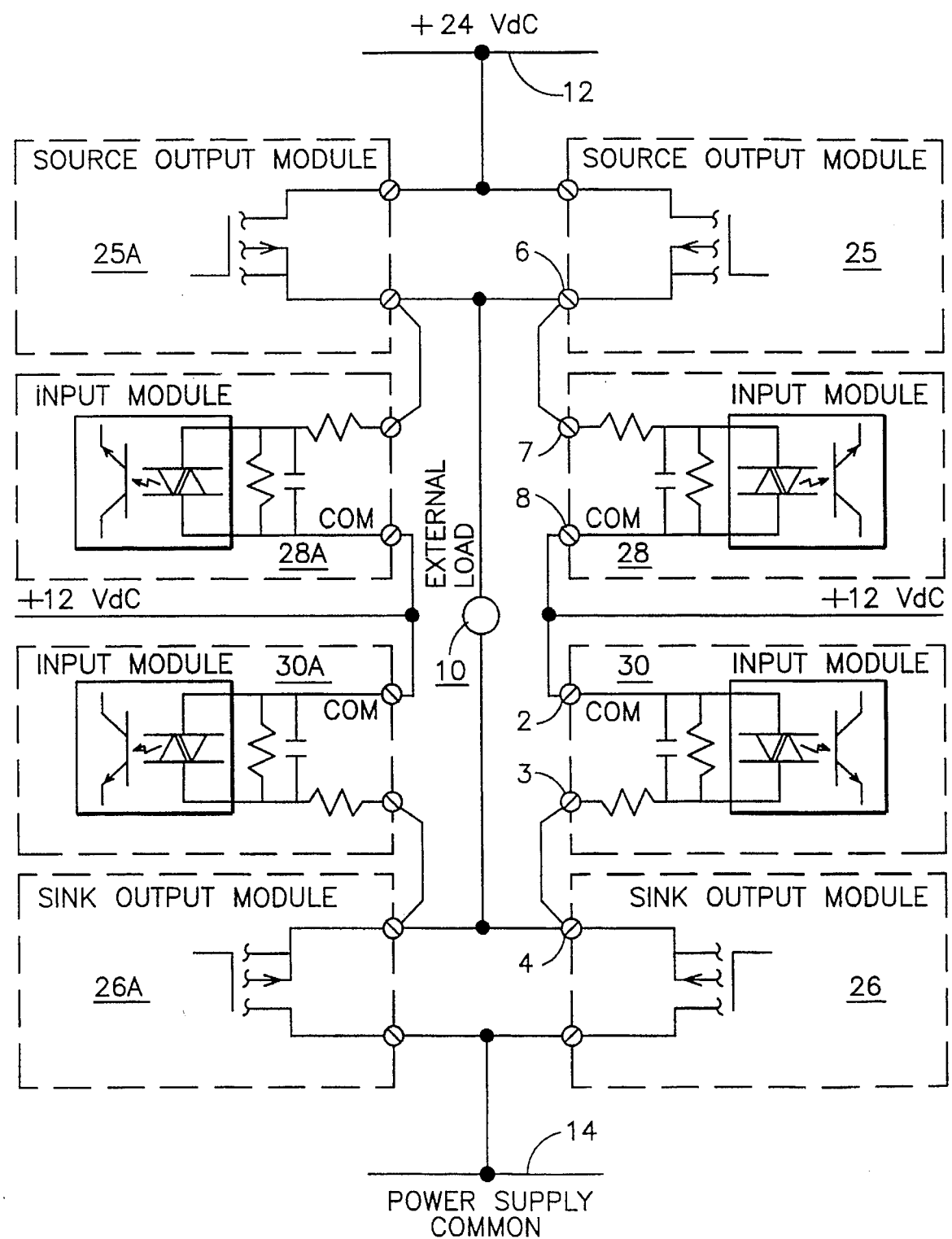
FIG. 4 is a simplified schematic diagram of a diagnostic test arrangement for the output modules of FIG. 1.
Figure 5:
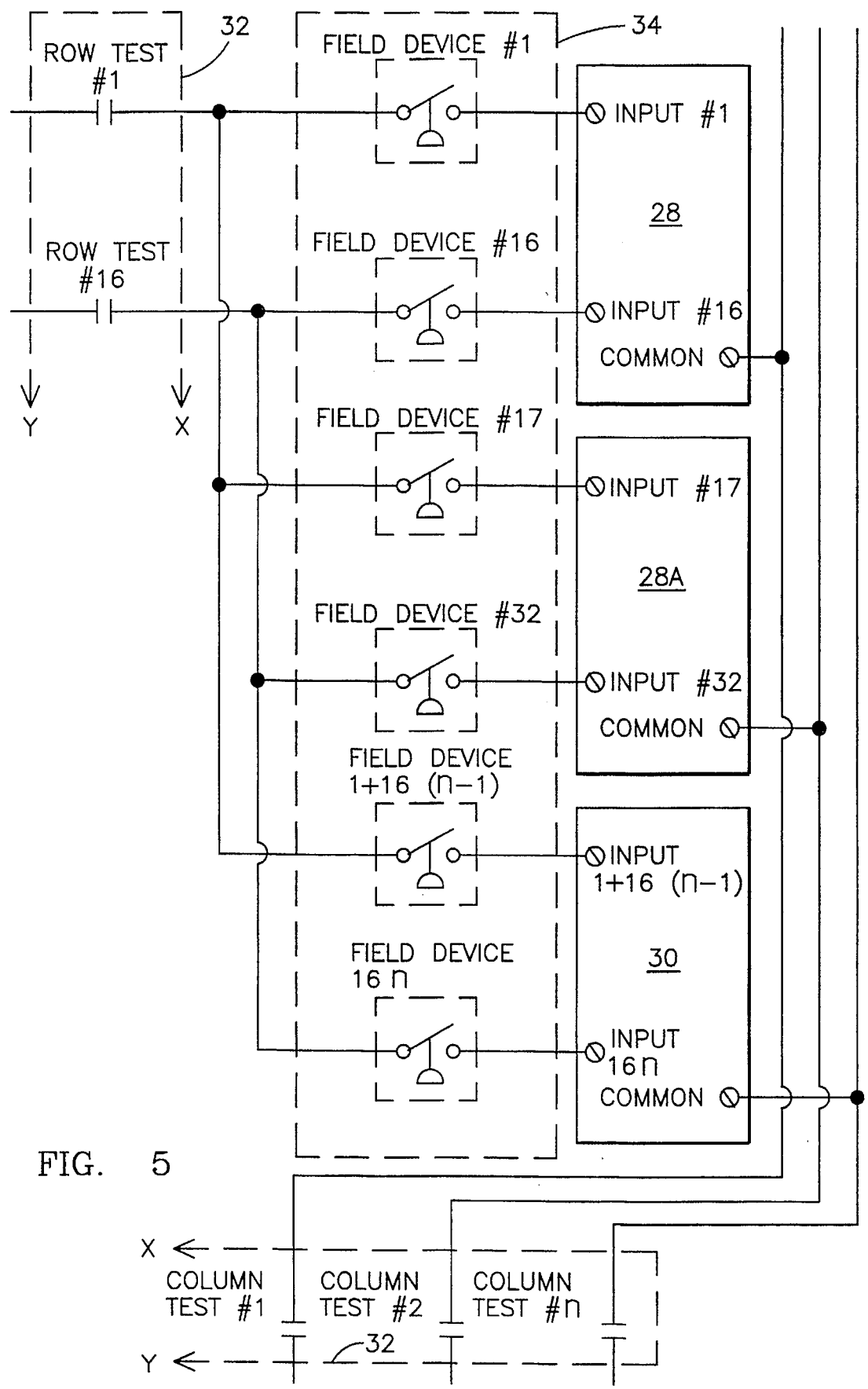
FIG. 5 is a simplified block diagram of a diagnostic test arrangement for the input modules of FIG. 1.

FIG. 4 shows a full H-pattern as used in the present invention. Notice that there is a voltage reference established at +12 Vdc relative to common which is not present in FIG. 3. More particularly, the +12 Vdc is coupled to the junction intermediate each of the pairs of input modules 28,30 and 28A, 30A. Compared to FIG. 3, the voltage available across the input modules was approximately one half of the power supply bus voltage with the bus allowed to vary between 20.4 and 28.8 volts implying that the input voltage range is 10.2 to 14.4 Vdc.

With a 12 Vdc bias inserted in series with each input module, and the bias arranged to subtract from the available input terminal voltage, then the voltage available to each input module varies between the limits −1.8 to +2.4 Vdc. This is less than 50% of the guaranteed Off voltage, which assures that if a module has been turned ON during the test interval, it will also turn OFF at the end of the test interval.

In addition to testing of the output modules 25,26 as described above, it is also possible to test the input modules 28,30.

The Input Diagnostic Test is able to detect:
1. a condition whereby two or more input connections upon the same input module are cross-connected, and/or
2. a condition in which a separate excitation source has been applied to an input which prevents it from turning OFF under the influence of its corresponding field device contacts, and/or
3. a condition in which there is a fault within the PLC which prevents valid input states from being presented to the application program.

The input module test utilizes a switching matrix 32 to control current flow through external field devices 34 and their corresponding PLC inputs in the input modules 28,28A,30,30A. Row Test Outputs of matrix 32 control excitation voltage to field devices 34 and Column Test Outputs of matrix 32 complete the current path for the Common connections on the PLCs' input modules.

Row and Column Test Outputs are turned ON allowing excitation to be applied to the field devices and providing a return circuit for the input modules, except during Diagnostic Testing. For the purposes of this discussion, the illustration shows simple outputs for conducting the tests. However, in implementation, a portion of the H-pattern of FIG. 3 is used. The H-pattern guarantees that a failure within the Row and Column Test outputs can be detected.

Assume that field devices 34 (such as limit switches, pressure switches, flow switches, etc.) are closed during normal operation allowing current to flow while the external process is in a normal condition. During an abnormal process situation, one or more field device contacts open, interrupting current flow through the circuit(s).

Diagnostic testing is scheduled over multiple PLC scans to minimize the impact upon scan time. Only one Row or Column is tested per scan. Row Testing detects a situation whereby one or more inputs are unintentionally cross-connected to each other, or there is a persistent source of excitation to one or more inputs. The test cycle is as follows:

1 Save all input states.
2 Turn OFF all Row test Outputs except for Row 1.
3 Verify that all inputs are OFF except for those attached to Row 1 Test Outputs.
  If one or more inputs which are not in Row 1 are ON, then there is a cross-connection. Set a failure flag for the faulty input(s).
4 Turn ON all Row test Outputs.
5 Restore all saved input states (from step 1).
6 Repeat Steps 1 through 5 for the remaining Rows (2 through 16).

Column Testing ensures that a PLC has not experienced an internal fault in which an input is incapable of assuming the OFF state. The test cycle is as follows:

1 Save all input states.
2 Turn OFF Column Test Output 1.
3 Verify that all inputs associated with column 1 are OFF.
  If one or more inputs are ON, then there is an internal fault. Set a failure flag for the faulty input(s).
4 Turn ON column Test Output 1.
5 Restore all input states.
6 Repeat Steps 1 through 5 for the remaining Columns (2 through 12).

Details of the above described fault tolerant system are given in the TMR30 Triple Modular Redundant System manual attached hereto as Appendix A and forming an integral part of the present application, the full disclosure of which is hereby incorporated by reference.

What is claimed is:

1. A fault tolerant control system for coupling a load to a power source between a relatively positive voltage output bus and a relatively negative voltage output bus of the power source, the system comprising:

a first and a second logic controller, each of said controllers having an output module coupled in circuit between a first terminal of the load and the relatively positive voltage bus;

a third and a fourth logic controller, each of said third and fourth controllers having an output module coupled in circuit between a second terminal of the load and the relatively negative voltage bus;

a communication bus interconnecting said first, second, third and fourth logic controllers; and program means operable in said fourth logic controller for energizing said output module thereof only when said output modules of said first and second logic controllers are energized.

2. The fault tolerant control system of claim 1 wherein each of said logic controllers includes an input module connected to a respective one of said first and second terminals of the load, said program means being operable to sequentially disable and enable selected ones of said logic controllers while monitoring output module operation with an input module of another controller.

3. The fault tolerant control system of claim 2 and including means for testing the operating condition of each controller without adversely effecting operation of the load, each of said controllers including an output module for coupling power between the power source and the load and an input module connected to monitor the status of the associated output module, said testing means sequentially disabling selected sets of said output modules and confirming operation of a selected one of said controllers by checking status of an input module of a parallel connected controller.

4. The fault tolerant control system of claim 2 in which the controllers implement the logical expression:

LOAD=AB OR BC OR AC where LOAD represents power applied to the load and A,B and C represent the status of three of the four controllers.

* * * * *